(12) United States Patent
Kawaguchi et al.

(10) Patent No.: US 6,332,339 B1
(45) Date of Patent: Dec. 25, 2001

(54) VACUUM DEGASSING METHOD FOR MOLTEN GLASS FLOW

(75) Inventors: Toshiyasu Kawaguchi; Koji Obayashi; Misao Okada, all of Kanagawa; Yusuke Takei, Tokyo, all of (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/547,669

(22) Filed: Apr. 12, 2000

(30) Foreign Application Priority Data

Apr. 13, 1999 (JP) .................................................. 11-105085

(51) Int. Cl.[7] ...................................................... C03B 5/16
(52) U.S. Cl. ................... 65/134.2; 65/32.5; 65/134.9; 65/135.1
(58) Field of Search .................................. 65/32.5, 134.9, 65/135.1, 134.2

(56) References Cited

U.S. PATENT DOCUMENTS

| | | |
|---|---|---|
| 1,598,308 | 8/1926 | Pike . |
| 3,519,412 | 7/1970 | Olink . |
| 5,316,563 | 5/1994 | Ishimura et al. . |
| 5,849,058 | 12/1998 | Takeshita et al. . |
| 5,851,258 | 12/1998 | Ando et al. . |

FOREIGN PATENT DOCUMENTS

| | | |
|---|---|---|
| 0 556 576 | 8/1993 | (EP) . |
| 0 775 671 | 5/1997 | (EP) . |
| 07-291633 | 11/1995 | (JP) . |

OTHER PUBLICATIONS

Patent Abstracts of Japan, vol. 17, No. 367, Jul. 12, 1993, JP 05 058646, Mar. 9, 1993.

Patent Abstracts of Japan vol. 14, No. 459, Oct. 4, 1990, JP 02 188430, Jul. 24, 1990.

S. Takeshita, et al., Boletin de la Sociedad Espanola de Ceramica y Vidrio, pp. 173–178, "Refining of Glasses Under Subatmospheric Pressures," Jan. 1, 1992.

C. Tanaka, et al., "Refining Of Glasses Under Subatmospheric Pressures," Proceedings Of The International Conference On Science And Technology Of New Glasses, (Oct. 16–17, 1991), pp. 71–76.

*Primary Examiner*—Michael Colaianni
(74) *Attorney, Agent, or Firm*—Oblon, Spivak, McClelland, Maier & Neustadt, P.C.

(57) ABSTRACT

When molten glass which is under an atmosphere of pressure P, is fed into a vacuum chamber capable of rendering a pressure to the molten glass to be in a range of 38 [mmHg] –(P-50) [mmHg] to perform degassing to the molten glass, a staying time of the molten glass in the vacuum chamber is in a range of 0.12–4.8 hours, whereby there is obtainable an effective degassing function to the molten glass.

5 Claims, 4 Drawing Sheets

VACUUM DEGASSING METHOD FOR
MOLTEN GLASS FLOW

The present invention relates to a vacuum degassing method for molten glass flow capable of removing bubbles properly and effectively from a continuous flow of molten glass obtained by melting glass materials.

Heretofore, it has been common to utilize a refining procedure to remove bubbles generated in molten glass obtained by melting raw materials of glass in a melting furnace, prior to forming the molten glass by a forming apparatus, in order to improve the quality of formed glass products.

There has been known such a method that in the refining procedure, a refining agent such as sodium sulfate ($Na_2SO_4$) is previously added to raw materials of glass and the molten glass obtained by melting the raw materials containing a refining agent is stored and maintained at a predetermined temperature for a predetermined period, during which bubbles in the molten glass grow by the help of the refining agent, rise to the molten glass surface, and the bubbles are removed.

Further, there has been known a vacuum degassing method wherein molten glass is introduced into a vacuum atmosphere under a reduced pressure; under such reduced pressure condition, bubbles in a continuous flow of molten glass grow up and rise to the molten glass surface at which bubbles break and are removed, and the molten glass is taken out from the vacuum atmosphere.

In the above-mentioned vacuum degassing method, the molten glass flow is formed under a reduced pressure wherein bubbles contained in the molten glass grow in a relatively short time and rise to the surface by using buoyancy of the grown-up bubbles in the molten glass, followed by breaking the bubbles on the surface of the molten glass. In this way, the method can remove bubbles effectively from the molten glass surface. In order to remove bubbles effectively from the molten glass surface, it is necessary to provide a high rising velocity of bubbles so that the bubbles come to the molten glass surface under a reduced pressure condition. Otherwise, the bubbles are discharged along with the molten glass flow, with the result that a final glass product contains bubbles and is defective.

For this reason, it is considered that the pressure in the reduced pressure atmosphere for vacuum degassing should be small as possible to grow up bubbles and the rising velocity be increased whereby the effect of vacuum degassing is improved.

However, when the pressure in the reduced pressure atmosphere for vacuum degassing is lowered, numerous new bubbles sometimes generate in the molten glass and the bubbles rise to the molten glass surface to form a floating foam layer without breaking. A part of the foam layer may be discharged along with the molten glass flow to result a defect in the glass product. When a foam layer grows, the temperature of the upper surface of the molten glass decreases. The foam layer tends to hardly break whereby the foam layer will further develop. As a result, the inside of the vacuum degassing apparatus is filled with non-breaking bubbles. The foam layer fully filling the apparatus may be in contact with impurities on the ceiling of the apparatus; thus, it brings the impurities in the final glass product. Consequently, excessively lowering the pressure in the atmosphere for vacuum degassing is not preferred for an effective treatment for vacuum degassing.

Further, the rising velocity of the bubbles in molten glass is determined by the viscosity of the molten glass as well as the size of the bubble. Accordingly, it is considered that the lowering of the viscosity of the molten glass, or the raising of the temperature of the molten glass can raise bubbles to the surface effectively. However, when the temperature of the molten glass is excessively raised, there causes an active reaction with the material of flow path, such as refractory bricks, with which the molten glass contacts. It may lead to occurrence of new bubbles and dissolution of a part of material of the flow path into the molten glass, thus resulting in deterioration of the quality of glass products. Further, when the temperature of the molten glass is raised, the strength of the material of the flow path is decreased, whereby the service life of the flow path is shortened and an extra equipment such as a heater for maintaining the high temperature of the molten glass is required. As a result, in order to conduct a proper and effective vacuum degassing treatment, it is difficult to lower excessively the pressure for vacuum degassing and also to raise excessively a temperature of the molten glass.

In the vacuum degassing method where several restrictions are imposed, the following conditions for effective degassing has been reported(SCIENCE AND TECHNOLOGY OF NEW GLASSES, Oct. 16–17, 1991, pages 75–76).

Figure 4:
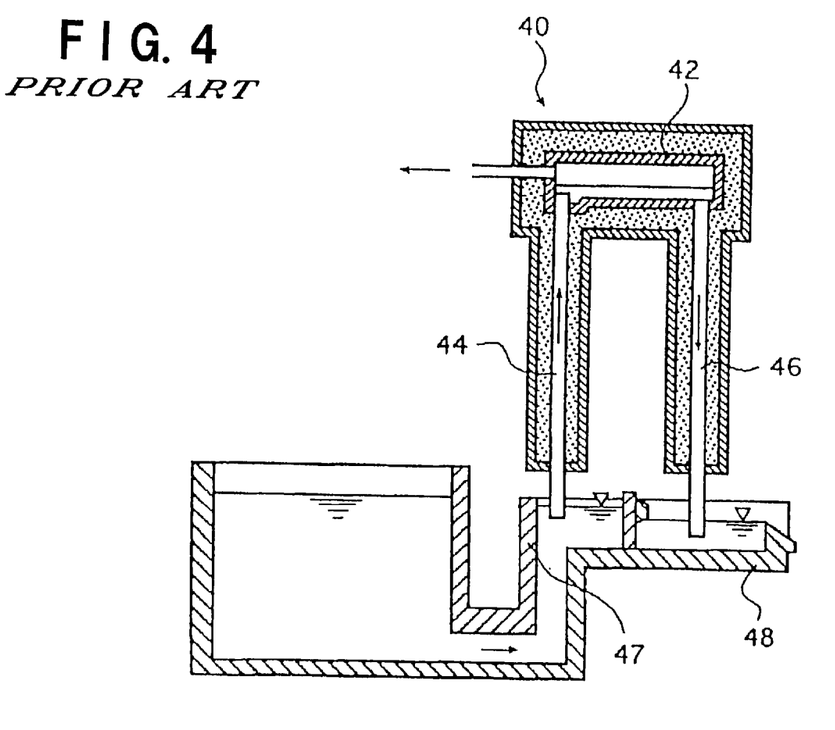
FIG. 4 is a diagrammatical cross-sectional view of a vacuum degassing apparatus for carrying out a conventional vacuum degassing method for molten glass flow.

In a vacuum degassing apparatus 40 for carrying out a vacuum degassing method for a molten glass flow as shown in FIG. 4, the number of bubbles (bubble density) in molten glass decreases to about $1/1,000$, when molten glass at 1,320° C. is passed in the apparatus at a flow rate of 6 [ton/day] wherein a pressure in a vacuum degassing vessel 42 is 0.18 atom (136.8 mmHg) and a staying time of the molten glass in the vacuum degassing vessel 42 under such a reduced pressure atmosphere is 50 minutes.

Namely, the above-mentioned vacuum degassing treatment is conducted in a bench scale type vacuum degassing apparatus 40 in the following way. The molten glass obtained by melting raw materials of glass is introduced from an upstream pit 47 into the vacuum degassing vessel 42 under a reduced pressure via an uprising pipe 44 by a vacuum pump (not shown), whereby a molten glass flow is formed in a substantially horizontal direction. Then, the molten glass is passed in the vacuum degassing vessel 42 under a reduced pressure to remove the bubbles in the molten glass, and then, the molten glass is fed via a downfalling pipe 46 to a downstream pit 48 where the temperature of the molten glass is maintained to have the viscosity of 1,000 poises.

The molten glass is sampled at the inlet of the uprising pipe 44 and the outlet of the downfalling pipe 46 to check the bubble density contained in each sample of the molten glass. As a result, the bubble density contained in the molten glass in the upstream pit 47 prior to a vacuum degassing is 150 [number/kg] and the bubble density contained in the molten glass in the downstream pit 48 is 0.1 [number/kg]. Thus, it is recognized that the number of the bubbles decreases to about $1/1,000$. It is also reported that a foam layer is not formed on the molten glass surface, although the pressure in the vacuum degassing vessel 42 is set to be low level as 0.18 atom.

The above-mentioned report discloses the vacuum degassing method wherein an effective vacuum degassing is attained when a pressure in the vacuum degassing vessel 42 is 0.18 atom (136.8 mmHg) and a staying time in the vacuum degassing vessel 42 is 50 minutes. However, it does not disclose various condition requirements for the vacuum degassing in order to obtain effectively superior results of vacuum degassing.

In particular, a vacuum degassing treatment should be carried out within a relatively short time under a reduced pressure atmosphere. Accordingly, under such conditions where the pressure in the reduced atmosphere can not be lowered excessively and the temperature of the molten glass can not be excessively high, as mentioned above, it is important to determine a staying time of the molten glass flow under the reduced pressure atmosphere.

The longer the staying time of the molten glass flowing in the vacuum degassing vessel 42, the uprising pipe 44 and the downfalling pipe 46, the lower the bubble density of the molten glass after vacuum degassing treatment.

In order to elongate the staying time of the molten glass under a reduced pressure atmosphere, it is considered to extend the length of flow path of the molten glass in a flow direction. However, this causes practical problems such as a remarkable increase in cost of the equipment due to the reasons as follow. Since an insulator for insulating a high temperature of the molten glass and a housing as a casing to maintain a reduced pressure, which surrounds the insulator and materials for the flow path, are provided at an outer periphery of the flow path for passing the molten glass of high temperature, the insulator and the housing must be extended according to the extension of the flow path. Further, a heavy structural unit comprising the materials for the flow path, the insulator and the housing must be movable so that the height of the unit can be adjusted depending on a pressure in the vacuum degassing vessel 42. This creates a large-sized movable equipment, hence, cost of the equipment will increase.

It is considered that the staying time can be extended by lowering the flow velocity of the molten glass. However, in order to lower the flow velocity, it is necessary to increase the viscosity by decreasing the temperature of the molten glass. In this case, it is difficult to raise the bubbles in the molten glass having a high viscosity to the molten glass surface.

On the other hand, when the staying time of the molten glass under a reduced pressure atmosphere is shortened excessively, sufficient degassing of the bubbles in the molten glass can not be achieved. Namely, a sufficient time for growing the bubbles in the molten glass under a reduced pressure atmosphere to raise them to the molten glass surface to thereby remove the bubbles by breaking can not be obtained, with the result that the molten glass with the bubbles may be discharged before the bubbles reach the molten glass surface. Although it is possible to lower the viscosity of the molten glass, i.e., to elevate the temperature of the molten glass in order to increase the rising velocity of bubbles in the molten glass, the temperature of the molten glass can not be increased because of the problems of a reduction in strength of the materials used for the flow path for the molten glass and the occurrence of new bubbles caused by the reaction of these materials with the molten glass.

It is an object of the present invention to provide a vacuum degassing method for molten glass flow, which is capable of obtaining effectively and certainly molten glass without containing bubbles by specifying a range of staying time of the molten glass in a case of conducting a degassing treatment to a continuous flow of molten glass under a reduced pressure atmosphere.

Further, the present invention aims at determining a proper range of vacuum degassing conditions for the molten glass under a reduced pressure atmosphere in the above-mentioned vacuum degassing method so that molten glass without containing bubbles can further be effectively and certainly obtained.

The inventors of this application have made extensive studies on vacuum degassing methods for molten glass flow to achieve the above-mentioned objects, and have found that it is necessary to make bubbles grown in molten glass to raise them to the molten glass surfaces where the breaking of the bubbles takes place, whereby the bubbles in the molten glass can effectively and certainly be removed. Thus, the present invention has been accomplished by satisfying the below-mentioned conditions:

1. The molten glass is continuously passed.
2. A condition that new bubbles are not generated is provided.
3. The diameter of bubbles is increased in a prescribed time so as to have a sufficient buoyancy.
4. The rising velocity of bubbles is provided to the bubbles so as to be against the molten glass flow.
5. A sufficient amount of gases to be diffused into the bubbles is assured so that the bubbles reaching the molten glass surface can be broken.

In accordance with the present invention, there is provided a vacuum degassing method for molten glass which comprises feeding, under an atmosphere of pressure P [mmHg], molten glass into a vacuum chamber capable of rendering a pressure to the molten glass to be in a range of 38 [mmHg]–(P-50) [mmHg] to perform degassing to the molten glass, and discharging the molten glass after having been degassed from the vacuum chamber at a flow rate of Q [ton/hr] under the atmosphere of pressure P [mmHg] wherein a staying time of the molten glass in the vacuum chamber is in a range of 0.12–4.8 hours, which is obtained by dividing a weight W [ton] of the molten glass flowing in the vacuum chamber by a flow rate Q [ton/hr] of the molten glass. In this case, the staying time in the vacuum chamber is preferably not less than 0.12 hour but not more than 0.8 hour.

Further, the vacuum chamber preferably includes a vacuum degassing vessel in which the molten glass is passed in a substantially horizontal state and is degassed, and a depth H [m] of the molten glass in the vacuum degassing vessel and a weight W [ton] of the molten glass satisfy the below-mentioned Formula (1):

$$0.010 \text{ m/ton} < H/W < 1.5 \text{ m/ton.} \tag{1}$$

Further a surface area $S_1$ [m$^2$] of the molten glass surface in the vacuum degassing vessel and a flow rate Q [ton/hr] of a molten glass flow preferably satisfy the below-mentioned formula (2):

$$0.24 \text{ m}^2 \cdot \text{hr/ton} < S_1/Q < 12 \text{ m}^2 \cdot \text{hr/ton} \tag{2}$$

Further, the vacuum chamber preferably includes a downfalling pipe connected to the vacuum degassing vessel to discharge the molten glass therethrough, and a surface area $S_2$ [m$^2$] of flow path of the downfalling pipe at the portion where the downfalling pipe is connected to the vacuum degassing vessel and a flow rate Q [ton/hr] of the molten glass satisfy the below-mentioned Formula (3):

$$0.008 \text{ m}^2 \cdot \text{hr/ton} < S_2/Q < 0.96 \text{ m}^2 \cdot \text{hr/ton} \tag{3}$$

In drawings:

FIG. 1(*a*) is a diagrammatical cross-sectional view for explaining an important portion of a vacuum degassing apparatus for carrying out the vacuum degassing method for molten glass flow according to the present invention;

FIG. 1(*b*) is a diagrammatical cross-sectional view taken along a line B–B' in FIG. 1(*a*);

FIG. 1(*c*) is a diagrammatical cross-sectional view taken along a line C–C' in FIG. 1(*a*);

Preferred embodiments of the vacuum degassing method for molten glass flow of the present invention will be described with reference to the drawings.

As described above, the present invention concerns a vacuum degassing method for molten glass flow to conduct degassing in a vacuum chamber wherein a range of staying time of the molten glass flowing continuously in the vacuum chamber is specified whereby molten glass free from bubbles can effectively and certainly be obtained.

Description will be made as to such vacuum degassing method with reference to FIGS. 1(a), 1(b) and 1(c).

Figures 1A, 1B:
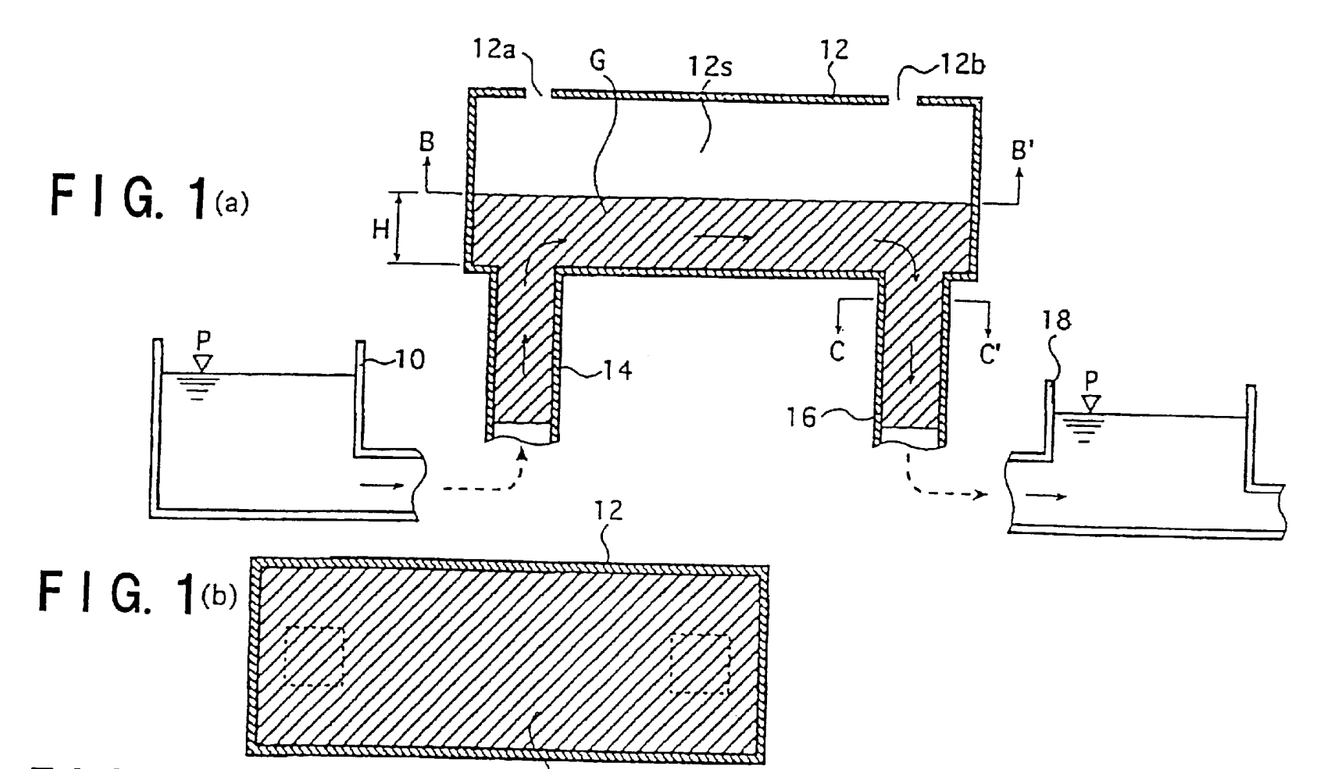
Figure 1C:
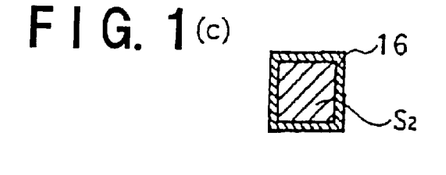

FIGS. 1(a)–(c) are diagrams for explaining important portions of a vacuum degassing apparatus for carrying out the vacuum degassing method for molten glass flow according to the present invention. The vacuum degassing method of the present invention comprises mainly a vacuum degassing step of removing bubbles in molten glass flowing in a substantially horizontal state under a reduced pressure atmosphere, an introducing step to introduce molten glass to be degassed to the vacuum degassing step and a discharge step to discharge the molten glass degassed in the vacuum degassing step.

In FIG. 1(a), the introducing step to introduce molten glass from a melting vessel 10 in which the molten glass obtained by melting raw materials of glass is stored under an atmosphere of pressure P[mmHg] into a vacuum degassing vessel 12 in which the vacuum degassing step is carried out, is conducted in an uprising pipe 14, during which a molten glass flow is formed. The vacuum degassing step to raise bubbles remaining in the molten glass flowing in a substantially horizontal direction to the molten glass surface under a reduced pressure atmosphere and to remove by breaking them at the molten glass surface, is conducted mainly in the vacuum degassing vessel 12. The discharging step to discharge the molten glass degassed in the vacuum degassing vessel 12 from a downstream pit 18 through the vacuum degassing vessel 12 is conducted in a downfalling pipe 16. The major portions of the uprising pipe 14 and the downfalling pipe 16 as well as the vacuum degassing vessel 12 for degassing are covered with a vacuum housing (not shown) connected to a vacuum pump, and evacuation of the vacuum degassing vessel is conducted through openings 12a, 12b formed in the ceiling of the vacuum degassing vessel 12 so as to maintain the reduced pressure to be constant.

A typical value of pressure P in this case is 760 [mmHg].

As described before, in such vacuum degassing method wherein bubbles in the molten glass flowing in the vacuum degassing vessel 12 are made grown and are raised in the molten glass to break them on the molten glass surface, a staying time of the molten glass in the vacuum degassing vessel 12, i.e., a time during which the molten glass is passed through the vacuum degassing vessel 12 can not be shortened excessively. It is also difficult to shorten excessively a time in which the molten glass rises to pass through the uprising pipe 14 even in the introducing step wherein the molten glass stored in the melting vessel 10 under an atmosphere of pressure P [mmHg] is sucked and raised into the vacuum degassing vessel 12 in a reduced pressure condition. It is because the pressure in a lower portion of the uprising pipe 14 is high due to the own weight of the molten glass, and the pressure in an upper portion of the uprising pipe 14 becomes gradually small toward the molten glass surface in the vacuum degassing vessel 12. Accordingly, when the molten glass rises in the uprising pipe 14, the pressure given to the molten glass is lower than the pressure P [mmHg] which is operated when the molten glass is obtained by melting raw materials. As a result, the bubbles in the molten glass grow while they pass through the uprising pipe 14. Further, new bubbles formed by gases dissolved in the molten glass grow while they rise in the uprising pipe 14.

Further, it is difficult to shorten excessively a time in which the molten glass passes through the downfalling pipe 16. The reason is as follows. As the molten glass descends in the downfalling pipe 16, the pressure to the molten glass gradually increases due to the own weight of the molten glass from a reduced pressure level in the vacuum degassing vessel 12. The pressure is finally restored to have the above-mentioned pressure P[mmHg]. However, the bubbles which are not removed even by a reduced pressure in the vacuum degassing vessel 12 dissolve to be gas components in the molten glass due to a pressure which increases as the molten glass descends in the downfalling pipe 16.

For this, the present invention provides a vacuum chamber which renders a pressure applied to the molten glass to be in a range of 38 [mmHg]–(P-50) [mmHg] with respect to a pressure P [mmHg], and includes a time in which the molten glass passes not only through the vacuum degassing vessel 12 but also parts of the uprising pipe 14 and the downfalling pipe 16. The reason why the pressure in the vacuum chamber is to be 38 [mmHg] or more is that an unexpected discharge (reboil) of dissolved gases in the vacuum chamber can be suppressed, as described before. The vacuum chamber defined as described above corresponds to a roughly hatched portion in FIG. 1.

In order to feed the molten glass continuously in the vacuum chamber, it is necessary to design a flow path for the vacuum chamber so as to reduce the frictional resistance between an inner surface of the flow path of the vacuum chamber and the molten glass flow and to reduce sufficiently the pressure loss of fluid. In order to reduce sufficiently the pressure loss of fluid, designing of the shape and the cross-sectional surface area of the flow path of the vacuum chamber has been property conducted. However, since it is desirable that bubbles generated in the molten glass are inflated in a shorter time while the molten glass is passed continuously, whereby the bubbles are raised to the molten glass surface on which the breakage of the bubbles is caused, it is considered to lower the viscosity of the molten glass, i.e., to determine the temperature of the molten glass to be high. However, as described above, when the temperature of the molten glass is elevated, new bubbles are generated by the reaction of the materials used for the flow path of the vacuum chamber with the molten glass, or the materials dissolve into the molten glass to form cord, with the result that the quality of formed products can not be maintained. Further, the reaction of these materials with the molten glass accelerates erosion of the materials and the service life of the flow path for the vacuum chamber is shortened.

The rate of erosion of the flow path of the vacuum chamber caused by the molten glass flow is in proportion to $t/\eta$, i.e., the ratio of a time t to the viscosity $\eta$ of the molten glass wherein t represents a time in which the molten glass is passed through the flow path and η represents the viscosity of the molten glass. The rising distance of bubbles when the bubbles rise to the molten glass surface is in proportion to the square of t/η, i.e., the ratio obtained by dividing a time t in which the molten glass is passed through the flow path by the viscosity η of the molten glass. Accordingly, it is desirable to determine the viscosity of the molten glass to be lower within a permissible range on the rate of erosion, in order that a sufficient rising distance of the bubbles can be maintained.

A preferred range of the viscosity of the molten glass is 500–5,000 poises. Further, in order to raise bubbles in the molten glass having the viscosity of such range to the molten glass surface, the bubbles should have a diameter of 10–30 mm. In this case, when the diameter of the bubbles exceeds 30 mm, the bubbles reaching the surface do not break and a foam layer remains on the surface. This reduces heat transfer efficiency in the vacuum degassing vessel 12 and the temperature of the molten glass itself is reduced whereby the vacuum degassing effect decreases.

An analysis of gas has revealed that bubbles rise to the molten glass surface in the vacuum degassing vessel 12 to emit $CO_2$ and $H_2O$. In this case, there is found through direct observation of the inside of the vacuum degassing vessel 12 that an unexpected discharge (reboil) of dissolved gasses such as $CO_2$, $H_2O$ and so on in the molten glass easily takes place under a certain pressure (limit pressure) or lower. Such reboil occurs at a limit pressure of 0.05 atm in the molten glass having a viscosity of, for example, 500–5,000 poises, and accordingly, it is preferable to conduct the degassing under an atmosphere of such pressure or higher.

Further, in order that the diameter of the bubbles is increased so that the bubbles have a sufficient buoyancy in a time in which the molten glass is passed through the vacuum chamber, it is necessary to diffuse or introduce gas components existing in a dissolving state in the molten glass into small bubbles, e.g., bubbles having a diameter of 0.05–3 mm, containing in the molten glass in the melting vessel 10 under a reduced pressure atmosphere in the vacuum degassing vessel 12 so as not to cause the generation of the reboil. The reasons are as follows. It is difficult to grow the bubbles by introducing gas components into small bubbles existing in the molten glass because the gas components have a high partial pressure under an atmosphere wherein the molten glass is obtained in the melting vessel 10, i.e., under the atmosphere of pressure P. Further, an attempt of bubbling to the molten glass so as to accelerate the introduction of the gas components into the bubbles by increasing gas components in the molten glass can not provide practically a sufficient effect.

In consideration of the above-mentioned, there is employed such technique that a molten glass flow is produced by passing the molten glass; small bubbles are made growing in a time in which the molten glass stays in the vacuum chamber; the bubbles growing in a reduced pressure atmosphere are upraised to the molten glass surface of the vacuum degassing vessel 12 to break the bubbles whereby the bubbles are removed, and bubbles which can not be sucked and removed by vacuum-degassing are made dissolved into the molten glass in the downfalling pipe 16 to thereby eliminate all the bubbles in the molten glass. In this case, according to the present invention, a staying time of the molten glass in the vacuum chamber, which is obtained by dividing a weight W [ton] of the molten glass flowing in the vacuum chamber by a flow rate Q [ton/hr] of the molten glass, is in a range of 0.12–4.8 hours, more preferably, in a range of 0.12–0.8 hour.

Here, the weight W [ton] of the molten glass flowing in the vacuum chamber implies the total weight of the molten glass in the vacuum chamber (in a portion indicative of a roughly hatched portion in FIG. 1(a)).

When the staying time is shorter than 0.12 hour, the bubble density of the molten glass can not be within a permissible range for good final products even though the viscosity of the molten glass is 500–5,000 poises and the pressure to the molten glass is 0.05 atmospheric pressure, i.e., 76 [mmHg] or higher. On the other hand, when the staying time is longer than 4.8 hours, the elongation of the vacuum chamber in a direction of flowing the molten glass is required, which invites a practical problems of increasing cost for the equipment.

A staying time of less than 0.8 hour provides preferred effects of removing efficiently the bubbles, and reducing the volatilization of volatile components from the molten glass surface.

Further, it is preferable that a depth H [m] of the molten glass in the vacuum degassing vessel 12 and a weight W [ton] of the molten glass flowing in the vacuum chamber satisfy the below-mentioned formula:

$$0.010 \text{ m/ton} < H/W < 1.5 \text{ m/ton}$$

H/W is preferably 0.012 m/ton or higher, more preferably 0.015 m/ton or higher. Further, H/W is preferably 1.2 m/ton or lower, more preferably, 0.9 m/ton or lower.

The reason that the ratio of the depth H [m] of the molten glass in the vacuum degassing vessel 12 to the weight W [ton] of the molten glass be within the above-mentioned range, is as follows.

If the depth H of the molten glass in the vacuum degassing vessel 12 is 0.010×W or lower, there is an increase of pressure loss due to a frictional resistance of the molten glass flow and it is impossible to pass the molten glass at a predetermined flow rate. On the other hand, if the depth is 1.5×W or higher, the bubbles of molten glass existing at or around the bottom of the vacuum degassing vessel 12 can not float to the molten glass surface while the molten glass stays in the vacuum degassing vessel 12. Further, when the depth of the molten glass in the vacuum degassing vessel exceeds 1.5×W as an upper limit of the above-mentioned range, the pressure to the molten glass staying at or around the bottom of the vacuum degassing vessel 12 is high and the growth of the bubbles of molten glass in that region is not accelerated whereby the bubbles can not rise to the molten glass surface and there is a case that the bubbles flow out from the vacuum degassing vessel.

A predetermined degassing effect is obtainable even by introducing the molten glass into the vacuum degassing vessel 12 to the full extent of the upper limit of the above-mentioned degassing-permissible range. However, it is preferred that the depth of the molten glass is about half as much as the height of the vacuum degassing vessel. For example, when the height of the vacuum degassing vessel 12 is 0.2 m–0.6 m, the depth of the molten glass should be in a range of 0.1 m–0.3 m.

In FIG. 1(a), the inside of the vacuum degassing vessel 12 has a shape of rectangular prism wherein the shape of flow path in cross section is rectangular and the depth H [m] of the molten glass in the vacuum degassing vessel 12 is constant. However, the present invention is not limited to the case that the inside of the vacuum degassing vessel is in a rectangular prism but the present invention is applicable to a case that the bottom surface of the vacuum degassing vessel is gradually or stepwisely raised or lowered from the upstream portion to the downstream portion of the vacuum degassing vessel while the surface of the ceiling of the vessel is maintained at a certain level. In this case, a depth in average of the molten glass means the depth H [m] of the molten glass.

Further, the inside of the vacuum degassing vessel 12 may be in a cylindrical column shape wherein the shape of the flow path in cross section is circular. In this case, the depth H [m] of the molten glass means the depth in the deepest portion among depths varying along a width direction. In this case, the bottom surface of the vacuum degassing vessel 12 may be gradually or stepwisely raised or lowered from the upstream portion to the downstream portion of the vessel for flowing the molten glass. In determination of the depth H [m] of the molten glass, it is obtained by simply averaging depths of the molten glass flow.

As described above, it is necessary to assure the introduction of the dissolved gas components into bubbles as much as possible so that the bubbles in the molten glass rise in the molten glass to cause the breakage of them. In this case, the bubbles reaching the molten glass surface to form a foam layer unless they are broken. The foam layer has a heat insulating effect, and prevents the breakage of bubbles in association with a reduced temperature at the molten glass surface. When the foam layer grows, the foam layer may flood over the vacuum degassing vessel 12, or may be discharged from the vacuum degassing vessel 12 along with the molten glass flow.

From this standpoint, the breakage of the bubbles is essential. However, the breakage of bubbles depends on a temperature of the molten glass surface and a rate of introduction of gases into the bubbles as well as the surface tension of each bubble forming the foam layer and the viscosity of the molten glass forming each bubble. Accordingly, when a formulation for the molten glass and a temperature for a vacuum degassing treatment for the molten glass are determined, a relation of an air-contacting surface area of the molten glass, which is necessary for the breakage of the bubbles, to a flow rate of the molten glass has to be determined to be a predetermined range.

Namely, in the process of raising the bubbles in the molten glass in the vacuum degassing vessel 12 to the molten glass surface where the breakage of the bubbles is caused while the molten glass is passed through the inside of the vessel 12, and gas components contained in the bubbles are discharged to an upper space 12s under a reduced pressure condition, it is preferable, in the present invention, for causing the breakage of the bubbles that the surface area of the molten glass $S_1$ [m²] (the surface area in a roughly hatched portion shown in FIG. 1(b)) which contacts the upper space 12s under a reduced pressure condition and the flow rate Q [ton/hr] of the molten glass satisfy the following formula:

$$0.24 \text{ m}^2 \cdot \text{hr/ton} < S_1/Q < 12 \text{ m}^2 \cdot \text{hr/ton}$$

More preferably, they should satisfy the following formula:

$$0.5 \text{ m}^2 \cdot \text{hr/ton} < S_1/Q < 10 \text{ m}^2 \cdot \text{hr/ton}$$

The reason why the above-mentioned formulas are established is as follows. If the surface area $S_1$ [m²] of the molten glass surface in the vacuum degassing vessel 12 is 0.24×Q or lower, a large number of bubbles rising to the molten glass surface stay on the surface to produce a foam layer which remains unbroken in the vacuum degassing vessel 12, whereby the degassing treatment can not properly be conducted. On the other hand, if the surface area $S_1$ [m²] is 12×Q or higher, the molten glass in the vacuum degassing vessel 12 has a shallow depth whereby the molten glass can not be passed at a predetermined flow rate due to a frictional resistance caused by the molten glass flow.

In FIG. 1(b), the molten glass surface of the molten glass which contacts the upper space 12s under a reduced pressure condition has a rectangular shape. However, in the present invention, the shape of the molten glass surface is not limited to this but it may have such a shape that an inner width of the vacuum degassing vessel 12 is gradually or stepwisely narrowed or broadened from the upstream portion to the downstream portion of the vessel 12.

Further, a rate of rising of the bubbles in the molten glass flow which rise as they grow, is related by the diameter of the bubbles and Stoke's formula. When the viscosity of the molten glass is determined, a time required for the rising of bubbles to the molten glass surface is determined depending on the size of the bubbles. For example, when the viscosity of the molten glass used is 500–5,000 poises and assuming that for bubbles, it takes 60 min for floating a distance of 100 cm, the smallest diameter of the bubbles should be 10 mm or more in a case of 500 poises, and the smallest diameter be 30 mm or more in a case of 5,000 poises. Namely, the bubbles having a diameter of 30 mm or more can certainly be degassed and removed in a time of 60 min. In this case, the rate of rising of 0.25 cm/sec or more is obtainable.

Accordingly, in order to assure the rising of the bubbles against the molten glass flow, it is necessary to determine the flow rate of the molten glass to be a rate lower than 0.25 cm/sec (for example, when the molten glass is passed at a flow rate of 500 ton/day, the surface area of the flow path in cross section in the vacuum degassing vessel 12 is 9,200 cm² or more and the length of flow path in the vacuum degassing vessel 12 is about 1 m).

In this case, as shown in FIG. 1(a), the downfalling pipe 16 is provided to descend the molten glass wherein a falling flow is formed at or near an outlet port of the vacuum degassing vessel 12 connected with the downfalling pipe 16. When a rate of rising of the bubbles in the molten glass is lower than a rate of falling of the falling flow, bubbles growing in the molten glass are entrained by the falling flow without rising to the molten glass surface at or near the outlet port connected with the downfalling pipe 16, with the result that it is a danger of discharging the molten glass containing therein the bubbles.

Accordingly, in the present invention, the surface area $S_2$ [m²] of the surface in cross-section of the flow path of the downfalling pipe 16 (the surface area in a roughly hatched portion in FIG. 1(c)) which is connected to the vacuum degassing vessel 12 and the flow rate Q [ton/hr] of the molten glass preferably satisfy the following formula. Namely, either only the downfalling pipe 16 or both of the downfalling pipe 16 and the uprising pipe 14 preferably satisfy the following formula:

$$0.008 \text{ m}^2 \cdot \text{hr/ton} < S_2/Q < 0.96 \text{ m}^2 \cdot \text{hr/ton}$$

More preferably, they should satisfy:

$$0.01 \text{ m}^2 \cdot \text{hr/ton} < S_2/Q < 0.96 \text{ m}^2 \cdot \text{hr/ton},$$

in particular, $$0.01 \text{ m}^2 \cdot \text{hr/ton} < S_2/Q < 0.1 \text{ m}^2 \cdot \text{hr/ton}.$$

The reason why they should satisfy the above-mentioned formulas is as follows.

When the surface area $S_2$ [m²] in cross section of the flow path of the downfalling pipe 16 is 0.008×Q or lower, a downward vector in the flow velocity of the molten glass flow at or near the outlet port connected with the downfalling pipe 16 is increased whereby bubbles are entrained by the molten glass flow in the downfalling pipe 16 against a floating action. On the other hand, when the surface area $S_2$ [m²] in cross section of the flow path is 0.96×Q or more, the diameter of the downfalling pipe 16 is increased, which will increase the weight and the cost for the equipment.

In the embodiment shown in FIG. 1(*c*), the shape of the flow path in cross section is rectangular. However, the present invention is not limited to have such shape but a circular shape may be used for example.

The present invention concerns a vacuum degassing method for degassing molten glass under an atmosphere of pressure P [mmHg]. However, the atmosphere of pressure P [mmHg] is not always necessary as an atmosphere of atmospheric pressure. For example, it may be an atmosphere under an optional pressure which is employable in a case that molten glass is produced in a closed melting vessel which is isolated from atmospheric pressure. Further, the molten glass under an atmosphere of pressure P [mmHg] may not have a free surface thereof.

Now, the vacuum degassing method for molten glass according to the present invention will be described in detail with reference to Examples. However, it should be understood that the present invention is by no means restricted by such specific Examples.

In Examples, the degassing of molten glass flow was conducted under various conditions as described below to examine the number of bubbles contained in the molten glass, i.e., the bubble densities, before and after the degassing treatment. Further, a vacuum degassing apparatus 20 as shown in FIG. 2 was used to conduct the degassing treatment of molten glass flow.

Figure 2:
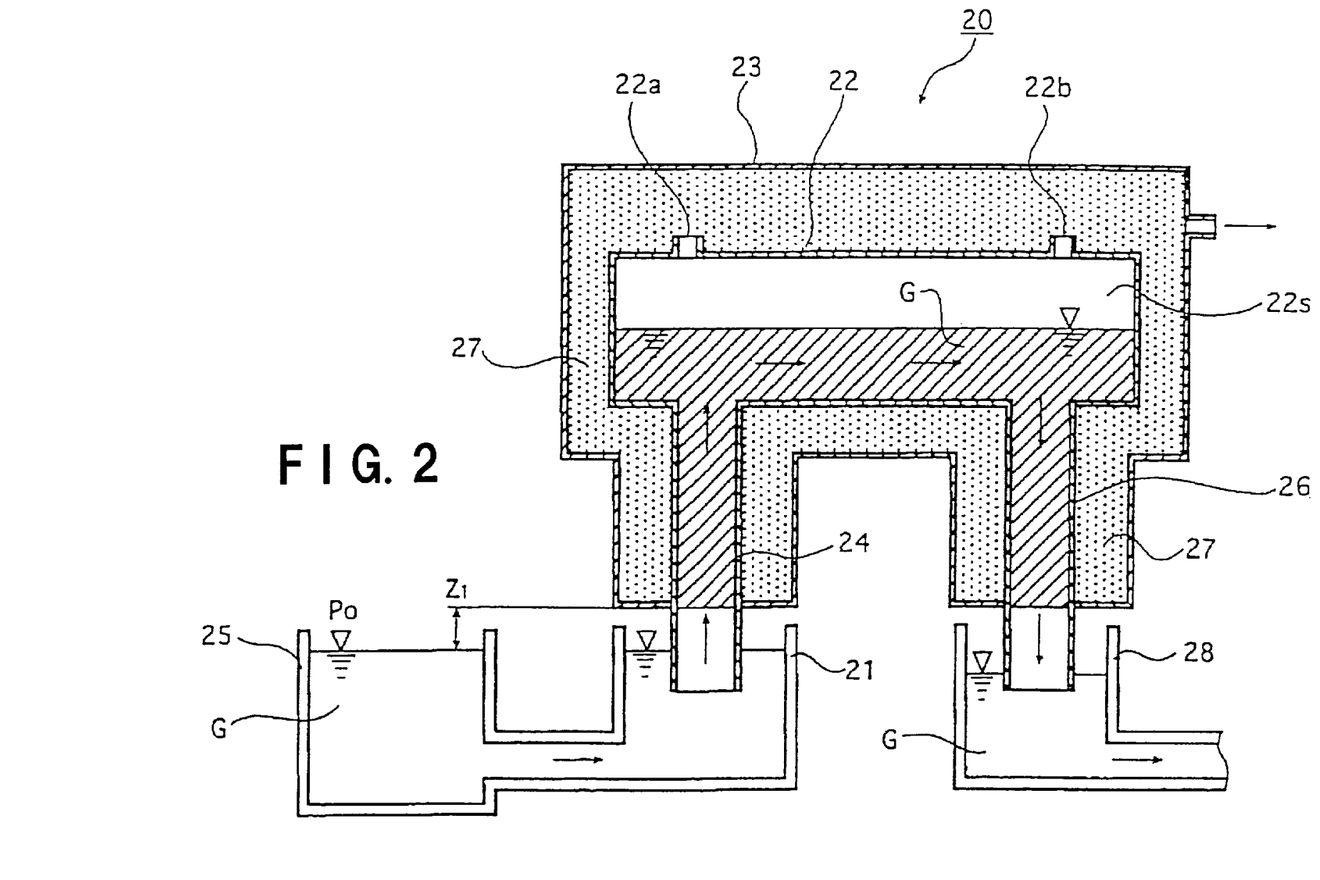
FIG. 2 is a diagrammatical cross-sectional view of a vacuum degassing apparatus for carrying out the vacuum degassing method for molten glass flow according to an Example of the present invention.

The vacuum degassing apparatus 20 shown in FIG. 2 was basically an apparatus for producing a molten glass flow along arrow marks in FIG. 2 by utilizing a principle of siphon caused by a difference of surface levels of molten glass in an upstream pit 21 and a downstream pit 28 to effect degassing to molten glass in a vacuum degassing vessel 22. The apparatus 20 was provided with a vacuum housing 23, the vacuum degassing vessel 22, an uprising pipe 24 and a downfalling pipe 26 which are constituted in one piece. Molten glass G was filled in the upstream pit 21 and the downstream pit 28, and the positions in height of the vacuum housing 23, the vacuum degassing vessel 22, the uprising pipe 24 and the downfalling pipe 26 were adjacent properly depending on a pressure in the vacuum degassing vessel 22.

There was used the vacuum housing 23 which is made of a metallic casing having a substantially gate shape to maintain a hermetic property in the vacuum degassing vessel 22, the uprising pipe 24 and the downfalling pipe 26 and which is so constructed as to house the vacuum degassing vessel 22 and major portions of the uprising pipe 24 and the downfalling pipe 26; provides a reduced pressure condition in the inside of them by sucking air by means of a vacuum pump (not shown) provided at an exterior side and to maintain a reduced condition of a predetermined pressure through opening 22*a* and 22*b* formed in the vacuum degassing vessel 22 housed therein. Further, a heat insulating material 27 to block heat was arranged in a space surrounded by the vacuum degassing vessel 22, the uprising pipe 24, the downfalling pipe 26 and the vacuum housing 23.

A vacuum chamber suffering a pressure higher than 38 [mmHg] (0.05 atmospheric pressure) and lower than $(P_0-50)$ [mmHg] with respect to atmospheric pressure $P_0$ [mmHg], as a result of evacuating the vacuum housing 23, was formed in the vacuum degassing vessel 22, the uprising pipe 24 and the downfalling pipe 26. Specifically, the vacuum chamber was formed in the vessel 22, the uprising pipe 24 and the downfalling pipe 26 to extend in a portion which was higher in height level than a height level $Z_1$ with respect to the surface of the molten glass G in the melting vessel 25. Accordingly, the weight W [ton] of the molten glass flowing in the vacuum chamber corresponded to the entire weight of the molten glass contained in the uprising pipe 24, the vacuum degassing vessel 22 and the downfalling pipe 26 in an area extending from the height level $Z_1$ with respect to the molten glass G in the melting vessel 25 to the level of the surface of the molten glass G in the vacuum degassing vessel 22 (i.e., the molten glass existing in a roughly hatched portion in FIG. 2).

In this Example, the cross-sectional shape of flow paths in the vacuum degassing vessel 22, the uprising pipe 24 and the downfalling pipe 26 may be circular or rectangular. The depth H of the molten glass flow was constant in the flowing direction of the molten glass. Further, the width of the molten glass flow was made constant so that the shape of the surface of the molten glass flow which contacts an upper space 22*s* under a reduced pressure condition was rectangular.

In Examples 1–6 shown in Table 1, molten glass of kinds as shown by characters A–E, with which compositions are shown by weight % in Table 2, were used, and the above-mentioned vacuum degassing apparatus 20 was used to conduct degassing treatment under conditions of molten glass temperature [° C.] in Table 1.

In all Examples 1–6, sampling of the molten glass G in the upstream pit 21 and the downstream pit 28 was conducted after normal operations for the degassing treatments was started, and examination was made by an edge light method whether or not bubble densities were within a permissible range. In this case, the permissible range of bubble density was 1 [number/kg] or lower.

TABLE 1

| Example | 1 | 2 | 3 | 4 | 5 | 6 | Reference Example |
|---|---|---|---|---|---|---|---|
| Kind of glass | A | A | B | C | D | E | — |
| Pressure in vacuum degassing vessel | 53 | 68 | 190 | 84 | 152 | 91 | — |
| Temperature of molten glass | 1350 | 1340 | 1320 | 1400 | 1350 | 1300 | — |
| Flow rate Q of molten glass | 0.050 | 0.354 | 0.104 | 0.833 | 0.917 | 1.458 | 16.6667 |
| Weight W of molten glass | 0.200 | 0.346 | 0.210 | 1.200 | 1.100 | 1.200 | 13.800 |
| Depth H of molten glass | 0.150 | 0.150 | 0.175 | 0.200 | 0.175 | 0.200 | 0.250 |
| Surface area $S_1$ of molten glass surface | 0.480 | 0.720 | 0.630 | 2.400 | 2.200 | 2.400 | 16.200 |

TABLE 1-continued

| Example | 1 | 2 | 3 | 4 | 5 | 6 | Reference Example |
|---|---|---|---|---|---|---|---|
| Cross-sectional surface area $S_2$ | 0.0044 | 0.0120 | 0.0013 | 0.0450 | 0.0310 | 0.0450 | 0.5670 |
| W/Q | 4.000 | 0.977 | 2.019 | 1.441 | 1.200 | 0.823 | 0.828 |
| H/W | 0.750 | 0.433 | 0.833 | 0.167 | 0.159 | 0.167 | 0.018 |
| $S_1$/Q | 9.600 | 2.034 | 6.058 | 2.881 | 2.399 | 1.646 | 0.972 |
| $S_2$/Q | 0.088 | 0.034 | 0.013 | 0.054 | 0.034 | 0.031 | 0.034 |
| Bubble density before degassing treatment | 500 | 220 | 7000 | 3000 | 200 | 300 | — |
| Bubble density after degassing treatment | 0.1 | 0.2 | 0.5 | 0.6 | 0.5 | 0.2 | — |

TABLE 2

| Kind of glass | $SiO_2$ | $Al_2O_3$ | $B_2O_3$ | $ZrO_2$ | $Na_2O$ | $K_2O$ | MgO | CaO | SrO | BaO | $CeO_2$ | $Sb_2O_3$ | $SO_3$ | Cl |
|---|---|---|---|---|---|---|---|---|---|---|---|---|---|---|
| A | 60.0 | 2.0 | — | 2.4 | 8.0 | 7.0 | 0.5 | 2.0 | 8.5 | 9.0 | 0.3 | 0.3 | — | — |
| B | 75.0 | 3.5 | — | — | 15.0 | 0.3 | 6.0 | — | — | — | — | — | 0.2 | — |
| C | 58.0 | 11.0 | 6.0 | — | — | — | 2.0 | 3.0 | 6.7 | 15.0 | — | — | — | 0.3 |
| D | 71.5 | 2.0 | — | — | 13.0 | 0.3 | 4.0 | 9.0 | — | — | — | — | 0.2 | — |
| E | 57.9 | 7.0 | — | 3.0 | 4.0 | 6.0 | 2.0 | 5.0 | 7.0 | 8.0 | — | — | 0.1 | — |

In all the cases of Examples 1–6, the number of bubbles per unit weight before the vacuum degassing treatment was small and was within the permissible range as shown in Table 1, and there was no possibility of causing reduction in the quality of glass products.

From the above-mentioned Examples, it was revealed that the bubble densities were all within the permissible range and the degassing effect could effectively and certainly be obtained by providing the conditions as follows. Namely, molten glass was fed into a vacuum chamber which rendered a pressure to the molten glass to be higher than 38 [mmHg] and lower than ($P_0$-50) [mmHg], in which degassing of the molten glass was carried out, and the molten glass after the degassing was discharged at a flow rate of Q [ton/hr] under an atmosphere of pressure $P_0$ [mmHg] wherein a staying time of the molten glass in the vacuum chamber which is obtained by dividing the weight W [ton] of the molten glass flowing in the vacuum chamber by the flow rate Q [ton/hr] of the molten glass was in a range of 0.12–4.8 hours.

In this case, it was also revealed that the depth of the molten glass and the surface area of the molten glass surface in the vacuum degassing vessel and the surface area in cross section of the flow path in either the uprising pipe or the downfalling pipe were preferably within a predetermined ranges.

As in Reference Example, when a flow rate Q of the molten glass is large as 16.667 [ton/hr] (i.e., about 400 [ton/day]), it is desirable that the weight W of the molten glass in the vacuum chamber is 13.8 [ton]; W/Q is 0.828 [hr], and values for other conditions be as shown in Reference Example in Table 1.

As described above, detailed explanation has been made as to the degassing method for molten glass of the present invention. However, the present invention is not limited to the above-mentioned Examples. For example, as shown in FIG. 3, a vacuum degassing apparatus 30 can be constructed so that a melting vessel 35, an introducing pipe 34, a vacuum degassing vessel 32, a discharge pipe 36 and a downstream pit 38 are formed in one piece; a screw pump 31 is provided in the introducing pipe 34 to control a flow rate of the molten glass G; a screw pump 39 is provided in the discharge pipe 36 to accelerate discharging of the molten glass G, and the surface level of the molten glass is always made coincide with the level of the surface of the molten glass G in the melting vessel 35.

A vacuum chamber capable of providing a pressure which is higher than 38 [mmHg] and lower than ($P_0$-50) [mmHg] with respect to atmospheric pressure $P_0$ [mmHg] as a result of reducing pressure in the vacuum housing 33 is formed in a portion in the uprising pipe 34a, the vacuum degassing vessel 32 and the downfalling pipe 36a (i.e., a portion indicated by a roughly hatched portion in FIG. 3), wherein the portion is formed in an area from the front surface of the molten glass G in the melting vessel 35 to a level lower by $Z_2$ than the surface of the molten glass G. Thus, the formation of the vacuum chamber providing a pressure of ($P_0$-50) [mmHg] or lower in a portion which is lower in height level than the surface of the molten glass G in the melting vessel 35 is due to the fact that the flow rate of the molten glass is controlled by the screw pumps 31, 39 so that a pressure to the molten glass is changed.

Figure 3:
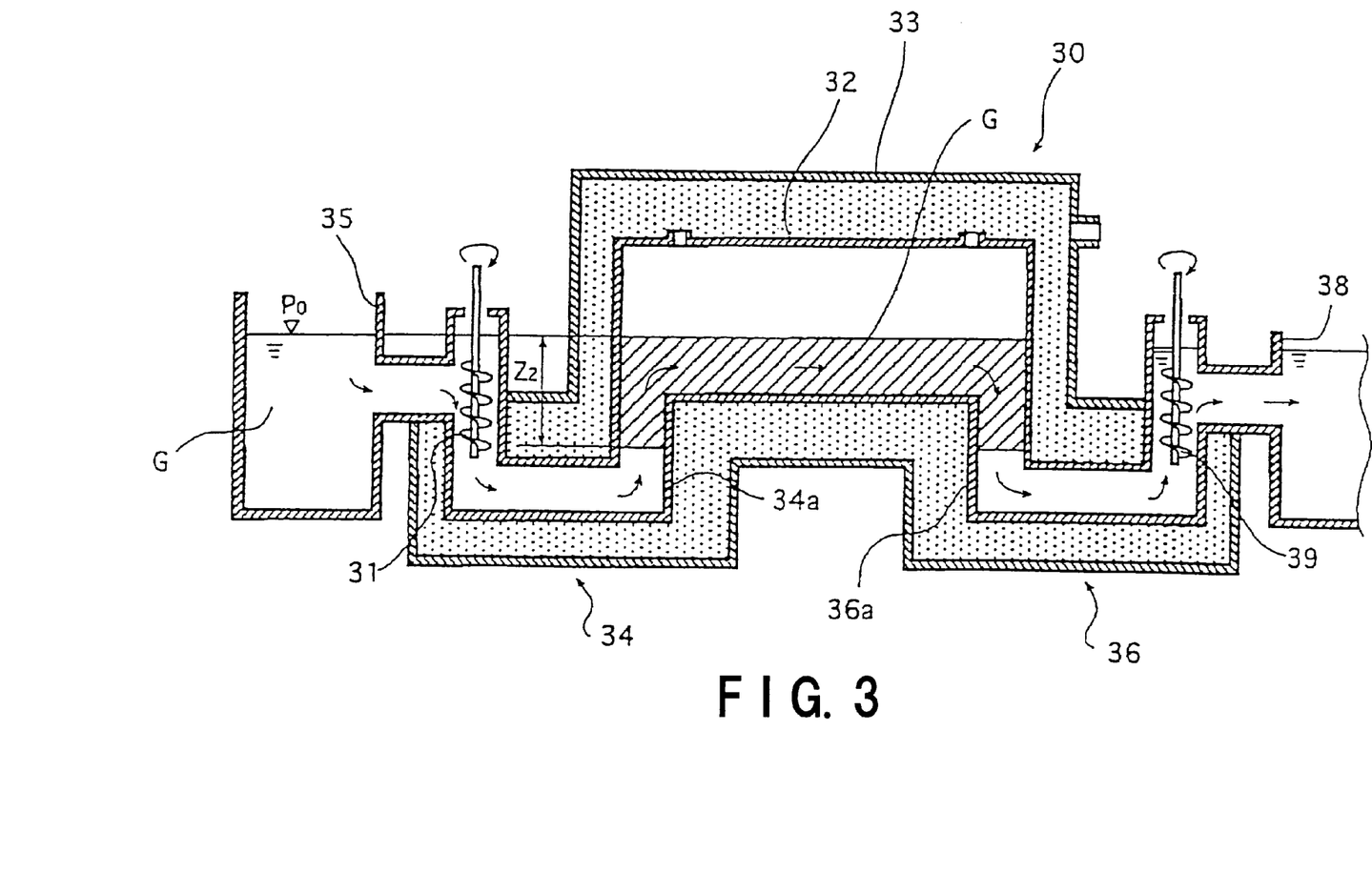
FIG. 3 is a diagrammatical cross-sectional view of a vacuum degassing apparatus for carrying out the vacuum degassing method for molten glass flow according to another Example of the present invention.

Accordingly, the weight W [ton] of the molten glass flowing in the vacuum chamber corresponds to the weight of the molten glass existing from the surface of the molten glass G in the melting vessel 35 to a level which is lower by $Z_2$ with respect to the surface of the molten glass G (the weight of the molten glass in a roughly hatched portion in FIG. 3).

In the present invention, various improvements and modifications can be made within the scope of the present invention.

As described above, according to the present invention, in conducting the degassing of molten glass flow wherein molten glass is introduced into a vacuum chamber which can provide a pressure range of higher than 38 [mmHg] but lower than ($P_0$-50) [mmHg] with respect to a pressure P applied to the molten glass in a melting vessel so as to perform the degassing of the molten glass, and the molten glass after degassing is discharged at a flow rate of Q [ton/hr] under an atmosphere of pressure P [mmHg], a staying time of the molten glass in the vacuum chamber obtained by dividing the weight W of the molten glass flowing in the vacuum chamber by the flow rate Q [ton/hr] of the molten glass is determined to be in a range of 0.12–4.8 hours, whereby molten glass free from entrainment of bubbles can effectively and certainly be obtained.

Further, the molten glass without any bubbles can effectively and certainly be obtained by determining the depth of the molten glass, the surface area of the molten glass surface in the vacuum degassing vessel and the cross-sectional area of the flow path in the downfalling pipe to be within predetermined ranges.

What is claimed is:

1. A vacuum degassing method for molten glass which comprises:

feeding, under an atmosphere of pressure P in mmHg, molten glass into a vacuum chamber capable of rendering a pressure to the molten glass to be in a range of 38 mmHg–(P-50) mmHg to perform degassing to the molten glass, and discharging the molten glass after having been degassed from the vacuum chamber at a flow rate of Q ton/hr under the atmosphere of pressure P mmHg wherein a staying time of the molten glass in the vacuum chamber is in a range of 0.12–4.8 hours, which is obtained by dividing a weight W in tons of the molten glass in the vacuum chamber by a flow rate Q ton/hr of the molten glass, wherein the vacuum chamber includes a vacuum degassing vessel in which the molten glass is passed in a substantially horizontal state and is degassed, and a depth H in meters of the molten glass in the vacuum degassing vessel and the weight W in tons of the molten glass satisfy the below-mentioned Formula (1):

$$0.010 \text{ m/ton} < H/W < 1.5 \text{ m/ton} \tag{1}$$

2. The vacuum degassing method for molten glass according to claim 1, wherein a surface area $S_1$ in $m^2$ of an exposed top portion of the molten glass in the vacuum degassing vessel and the flow rate Q in ton/hr of the molten glass satisfy the below-mentioned formula (2):

$$0.24 \text{ m}^2 \cdot \text{hr/ton} < S_1/Q < 12 \text{ m}^2 \cdot \text{hr/ton} \tag{2}$$

3. The vacuum degassing method for molten glass according to claim 1, wherein the vacuum chamber includes a downfalling pipe connected to the vacuum degassing vessel to discharge the molten glass therethrough, and a surface area $S_2$ in $m^2$ in cross section of a flow path of the downfalling pipe at a portion where the downfalling pipe is connected to the vacuum degassing vessel and the flow rate Q in ton/hr of the molten glass satisfy the below-mentioned formula (3):

$$0.008 \text{ m}^2 \cdot \text{hr/ton} < S_2/Q < 0.96 \text{ m}^2 \cdot \text{hr/ton} \tag{3}$$

4. A vacuum degassing method for molten glass which comprises:

feeding, under an atmosphere of pressure P in mmHg, molten glass into a vacuum chamber capable of rendering a pressure to the molten glass to be in a range of 38 mmHg–(P-50) mmHg to perform degassing to the molten glass, and discharging the molten glass after having been degassed from the vacuum chamber at a flow rate of Q ton/hr under the atmosphere of pressure P mmHg wherein a staying time of the molten glass in the vacuum chamber is in a range of 0.12–4.8 hours, which is obtained by dividing a weight W in tons of the molten glass in the vacuum chamber by a flow rate Q ton/hr of the molten glass, wherein the vacuum chamber includes a vacuum degassing vessel in which the molten glass is passed in a substantially horizontal state and is degassed, and wherein a surface area of $S_1$ in $m^2$ of an exposed top portion of the molten glass in the vacuum degassing vessel and the flow rate Q ton/hr of the molten glass satisfy the below-mentioned formula (2):

$$0.24 \text{ m}^2 \text{ hr/ton} < S_1/Q < 12 \text{ m}^2 \cdot \text{hr/ton} \tag{2}$$

5. The vacuum degassing method for molten glass according to claim 4, wherein the vacuum chamber includes a downfalling pipe connected to the vacuum degassing vessel to discharge the molten glass therethrough, and a surface area $S_2$ in $m^2$ in cross section of a flow path of the downfalling pipe at a portion where the downfalling pipe is connected to the vacuum degassing vessel and a flow rate Q in ton/hr of the molten glass satisfy the below-mentioned formula (3):

$$0.008 \text{ m}^2 \cdot \text{hr/ton} < S_2/Q < 0.96 \text{ m}^2 \cdot \text{hr/ton} \tag{3}$$

* * * * *